United States Patent [19]

Crookston et al.

[11] 4,451,717

[45] May 29, 1984

[54] CIRCUIT INTERRUPTER OPERATING MECHANISM HAVING A CHEMICAL OPERATOR WITH STATIONARY COMBUSTION CHAMBERS

[75] Inventors: Ronald W. Crookston, Penn Township, Westmoreland County; Ivan T. Burney, Plum, both of Pa.

[73] Assignee: Westinghouse Electric Corp., Pittsburgh, Pa.

[21] Appl. No.: 339,604

[22] Filed: Jan. 15, 1982

[51] Int. Cl.$^3$ .............................................. H01G 33/42

[52] U.S. Cl. .............................. 200/82 B; 200/148 R; 200/150 R; 200/148 F

[58] Field of Search ............. 200/82 B, 144 B, 148 R, 200/148 A, 150 R, 148 F

[56] References Cited

U.S. PATENT DOCUMENTS

| | | | |
|---|---|---|---|
| 2,485,394 | 10/1949 | Logan | 200/82 B |
| 4,131,774 | 12/1978 | Crookston et al. | 200/144 B |
| 4,251,701 | 2/1981 | Meyer | 200/82 B |
| 4,348,565 | 9/1982 | Yeckley et al. | 200/82 B |

*Primary Examiner*—Robert S. Macon

*Attorney, Agent, or Firm*—M. S. Yatsko

[57] ABSTRACT

An electric circuit interrupter comprising a pair of separable contacts, an operating mechanism for opening and closing the contacts and a drive mechanism including a cylinder-piston assembly and a gas pressure generator having multiple stationary combustion chambers and a directing device for selectively directing an expulsion of gaseous medium from any one of the multiple stationary combustion chambers.

10 Claims, 5 Drawing Figures

FIG. 1.
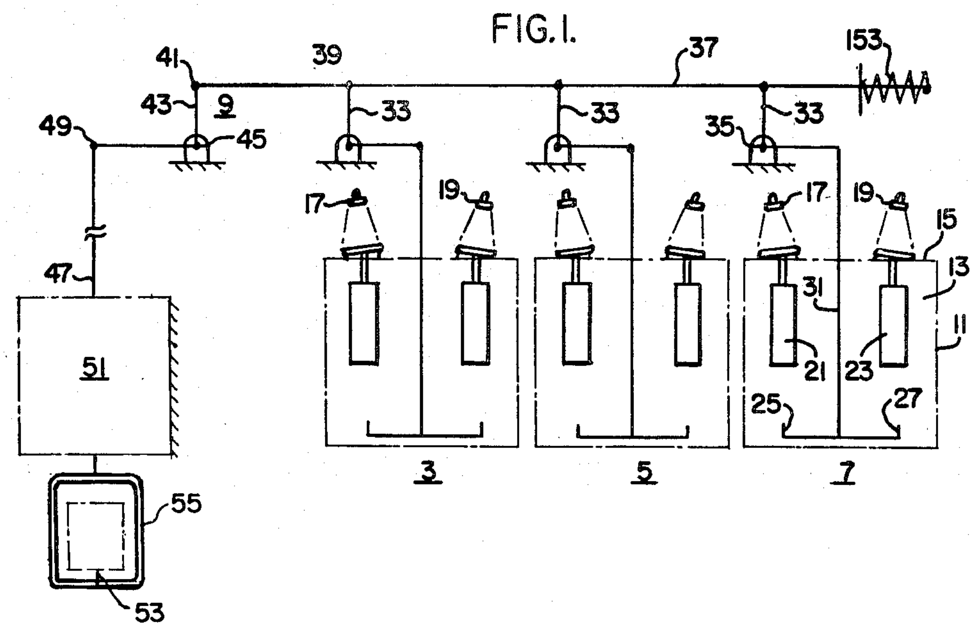
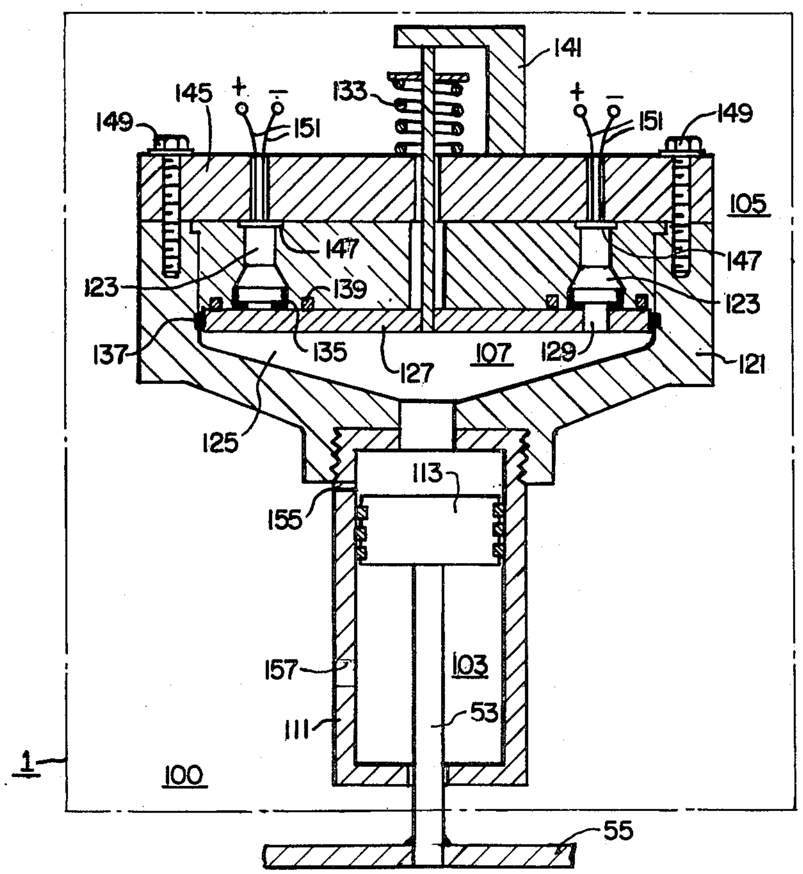
FIG. 3.

CIRCUIT INTERRUPTER OPERATING MECHANISM HAVING A CHEMICAL OPERATOR WITH STATIONARY COMBUSTION CHAMBERS

CROSS-REFERENCE TO RELATED APPLICATIONS

This application is related to concurrently filed copending U.S. patent application Ser. No. 39,605, filed Jan. 15, 1982 entitled "Circuit Interrupter Operating Mechanism Having A Chemical Operator With A Stationary Piston" by R. W. Crookston and I. T. Burney.

BACKGROUND OF THE INVENTION

1. Field of the Invention

The invention relates in general to a circuit interrupter drive mechanism and in particular to a chemical operator drive mechanism having stationary combustion chambers.

2. Description of the Prior Art

Modern circuit interrupter operating drive mechanisms may employ a chemical operator drive means comprising a gas generator of the chemical propellant type which ignites a propellant charge of explosive material to propel a high pressure gaseous medium through a conduit into a drive piston and cylinder assembly. When multiple operation capability is desired, the chemical operator may employ a fairly massive cylinder containing multiple propellant charges in combustion chambers which rotates in order to index the individual propellant charges into alignment with the conduit in order to direct the high pressure gaseous medium into the drive piston cylinder and cylinder assembly in a manner similar to a sporting arms revolver. Indexing or rotating the massive cylinder or housing containing the propellant charges necessitates considerable energy input, especially if it is desired to index the charges within a minimal time requirement. Accordingly, it would be desirable to have a chemical operator with stationary combustion chambers while still maintaining multiple propellant charge operating capability for multiple circuit breaker opening and/or closing capability.

SUMMARY OF THE INVENTION

Briefly the present invention is a new and improved electric circuit interrupter comprising a pair of separable contacts, operating means for opening and closing the contacts and a drive means for driving the operating means including a drive cylinder-piston assembly and a pressure generating means for generating an expulsion of gaseous medium into the drive cylinder-piston assembly. The pressure generating means includes a multiple propellant charge chemical operator gas generator having a fixed housing with multiple stationary propellant charge combustion chambers and a directing means for selectively directing the expulsion of gaseous medium from any one of the multiple combustion chambers into the drive cylinder-piston assembly. One embodiment of the invention utilizes a rotating seal plate and seal plate sealing means for the directing means for selectively directing the expulsion of gaseous medium into the drive cylinder-piston assembly. An alternate embodiment comprises a flat circular plate having an integral cylindrical wall as the seal plate in order to reduce the diameter and mass of the rotating seal plate while maintaining a given number of propellant charge combustion chamber selection capability. Another embodiment of the invention utilizess a check valve disposed between each multiple stationary combustion chamber and a conduit means for conducting the expulsion of gases from the selected combustion chamber to the drive cylinder-piston assembly, wherein the check valve arrangements permit the expulsion of gaseous medium out of the selected combustion chamber into the conduit means and prevent the movement of any expulsion of gas in the opposite direction. The chemical operator reloaders having stationary combustion chambers rather than a large rotating cylinder which contains the multiple combustion chambers provides the substantial benefit of reducing the mass that must be accelerated and decelerated in order to provide multiple combustion charge selection capability. A substantially lower mass seal plate is the indexed member. The check valve directing means eliminates the necessity to index or move any member.

BRIEF DESCRIPTION OF THE DRAWINGS

The invention may be understood, and further advantages and uses thereof more readily apparent, when considered in view of the following detailed description of exemplary embodiments, taken with the accompanying drawings, in which:

FIG. 1 is a diagrammatic elevational view, partly in section, showing a three-phase oil power circuit, operating mechanism and drive means constructed according to the teachings of the invention;

FIG. 3 is a vertical sectional view of one embodiment of the drive means shown generally in FIG. 1;

DESCRIPTION OF THE PREFERRED EMBODIMENT

Figure 2:
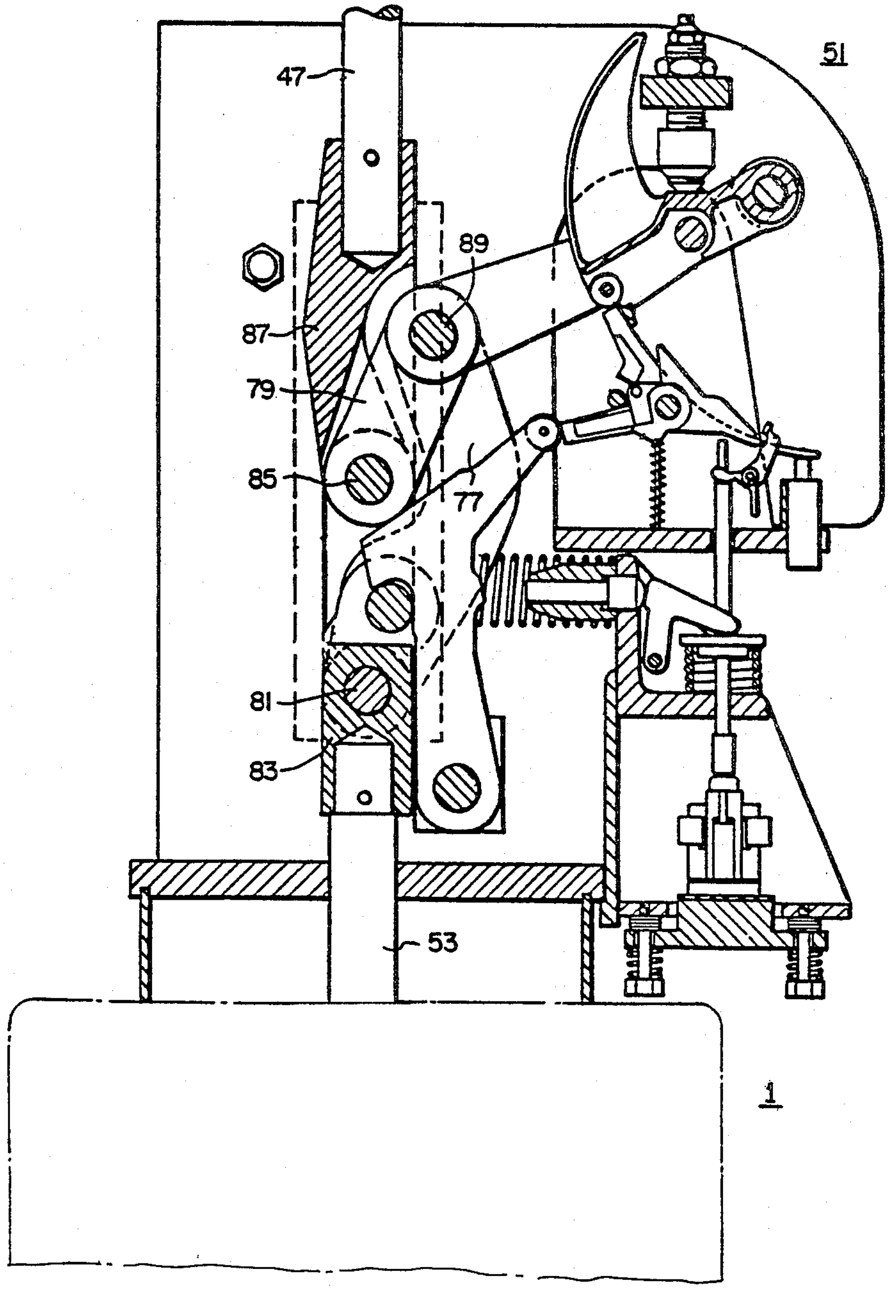
FIG. 2 is a vertical sectional view of the operating mechanism shown generally in FIG. 1.

Throughout this Description, like elements will be identified with like numerals. Similar elements with modifications will be identified with similar numerals with the addition of lower case letters (a, b, etc.). Referring now to the drawings, and in particular to FIG. 1 a drive mechanism is generally indicatd at 1 and is operatively connected to a plurality of circuit interrupters 3, 5, 7 of conventional type, such as oil-break, air-break, or gas-blast type. Operating means, generally indicated at 9, extend between the drive mechanism 1 and the circuit breakers 3, 5, 7, each of which is similar to that shown in the sectional view of the breaker 7 and is typical of such breakers, as shown more particularly in U.S. Pat. No. 2,477,788 which is referred to and incorporated herein. It comprises a tank 11 containing a suitable arc-extinguishing fluid 13, a cover 15, and two terminal bushings 17, 19. Spaced stationary contacts means 21, 23 are provided at the lower end of the terminal bushings 17, 19 which operate in conjunction with movable contacts 25, 27 mounted on a bridging contact member 29 at the lower end of an operating rod 31.

The upper end of each operating rod 31 is pivotally secured to lever means, such as, for example, a bell crank 33, which is stationarily pivoted at 35. A link 37 is pivoted at 39 to each bell crank 33 and at its other end is pivoted at 41 to a bell crank 43, which in turn is stationarily mounted at 45. A link 47, pivoted at 49 to the other end of the bell crank 43, is a vertical pull rod and is interconnected to a trip mechanism 51 that is connected to a drive means or drive mechanism 1 by means of a drive rod 53 and connecting link or yoke 55. Although the connecting link 55 is disclosed as being a yoke, it may instead be a C-shaped member or any other configuration extending around the assembly of the drive mechanism or drive means referred to generally at 1. The operating mechanism 9 comprises the several parts 31, 33, 37, 43, 47, and 51.

Referring now to FIG. 2 the tripping mechanism 51 is similar in construction and operation to that disclosed in U.S. Ser. No. 721,627, filed June 17, 1976 entitled "Circuit Breaker With Fast Trip Mechanism" of which the inventor is R. W. Crookston (now abandoned) and is incorporated by reference herein. Because of the full disclosure in that patent, the description of the operating mechanism is limited herein to the basic structure and operation.

The link 47 is operatively connected to drive rod 53 by a suitable linkage. Toggle links 77, 79 comprise a pair of spaced parallel links pivotally connected by a pivot pin 81 to a coupling 83. The toggle link 79 is a single link between the links 77 and is pivotally connected by a pivot pin 85 to a coupling 87. The toggle links 77, 79 are pivotally connected together by a knee pivot pin 89.

Referring now to FIG. 3 there is shown one embodiment of a drive mechanism referred to generally at 1 in FIG. 1 constructed according to the teachings of the invention. Drive means 100 includes drive cylinder-piston assembly 103, pressure generating means 105 for generating an expulsion of gaseous medium into drive cylinder-piston assembly 103 and directing means 107 for selectively directing the expulsion of gaseous medium. Drive cylinder-piston assembly 103 includes drive cylinder 111, drive piston 113 and drive rod 53. Pressure generating means 105 includes fixed housing 121 containing multiple combustion chambers 123. Directing means 107 includes conduit 125 and rotatable seal plate 127 having seal plate aperture 129 for directing the expulsion of gaseous mediums from any one of the multiple combustion chambers 123 into conduit 125 and thereafter into drive cylinder-piston assembly 103. Seal plate 127 rotates by means of indexing shaft 131 which is supported in housing 121 and biased by indexing spring 133 so that seal plate 127 is disposed in close sliding relationship with multiple combustion chamber sealing means 135 which may be, for example, an obturator seal. Seal plate 127 further seals off conduit 125 by second sealing means 137 which may be, for example, of the metallic type and third sealing means 139, respectively, which may be, for example, an O-ring type seal. Seal plate 127 is rotated or indexed on indexing shaft 131 by means of indexing means 141 which may be for example a solenoid energized or alternately a linkage motion energized reloader indexing arrangement. Indexing means 141 would be interlocked by means of a control circuit or mechanical linkage such that it would only index or rotate seal plate 127 during the stroke (opening in this instance) in which drive means 100 is not pressurized.

In operation rear plate 145 of housing 121 would be removed and propellant cartridges 147 would be inserted within multiple combustion chambers 123 and after rear plate 145 was resecured to housing 121 by means of securing means 149 which may be, for example, common machine bolts, seal plate 127 would be indexed so that seal plate aperture 129 aligns with a predetermined multiple combustion chamber 123 wherein the propellant cartridge within the selected multiple combustion chamber would be ignited by a sequential firing means shown in general at 151. An example of the propellant charge is a single or double-base smokeless gun powder which may generate a gas pressure of from about 3,000 to 10,000 psi or higher which would be sealed by first, second and third sealing means 135, 137, 139 respectively and directed through seal plate aperture 129, through conduit 125 and into drive cylinder-piston assembly 103 moving drive piston 113 and drive rod 53 downward, thereby closing the contacts in circuit interrupters 3, 5, 7 and charging opening spring 153 (FIG. 1) to enable opening of the contacts. Seal 135 seals the gas when flowing from 147 to 125. Seal 139 is a backup seal. When space 125 is pressurized, seal 137 prevents pressure and heat from getting: (a) out of chamber 125; and (b) to other cartridges 147. Seal 139 is to assure that any leakage past 137 does not get to other cartridges 147 and result in induced ignition. On the closing cycle, after drive piston 113 clears exhaust port 157 the pressurized gases within cylinder 111 are exhausted. A small bleed-off orifice 155 may also be disposed if required in cylinder 111 to bleed off pressure build-up due to movement of piston 113 during the opening operation. A small bleed-off orifice 155 latching in the full closed position is provided by latching and tripping mechanism 51. Opening of circuit breakers 357 is accomplished by activating tripping mechanism 51 in combustion with opening spring 153. The construction and operation of gas pressure generating means (although the invention is not limited thereto) is set forth more particularly in U.S. Pat. No. 4,271,341 and herein incorporated by reference.

Figure 4:
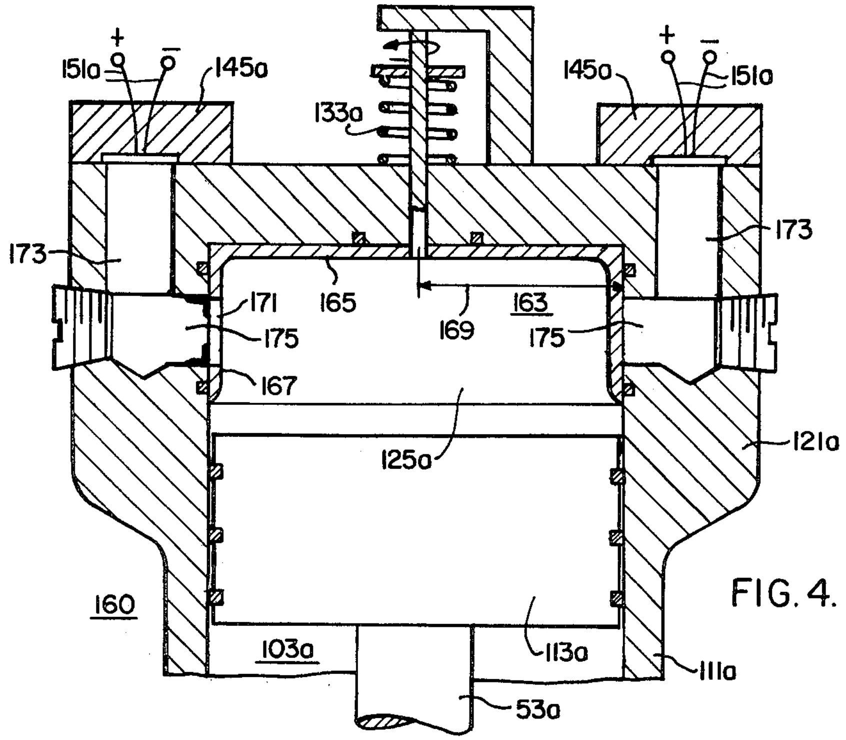
FIG. 4 is another embodiment of the drive means shown generally in FIG. 1.

Referring now to FIG. 4 there is shown another embodiment of the drive means constructed according to the teachings of the invention in which similar numbers combined with lower case letter a refer to similar parts with modifications to those shown in FIG. 3. Drive means 160 is similar in structure and operation to drive means 100, except that the alternate design of drive means 160 utilizes dished seal plate 163 including a flat circular portion 165 and an integral cylindrical wall portion 167 disposed at a predetermined radius 169. Seal plate aperture 171 now being disposed through cylindrical wall portion 167 of dished seal plate 163. Combustion chambers 173 of drive means 160 now include a radial portion 175 extending radially outward from predetermined radius 169 in close sliding relationship with cylindrical wall portion 167. The dished configuration of dished seal plate 163 provides drive means 160 with a smaller diameter seal plate for a given number of combustion chamber capacity housing which provides for a further reduction of the load on the indexing means for indexing or revolving the seal plate.

Figure 5:
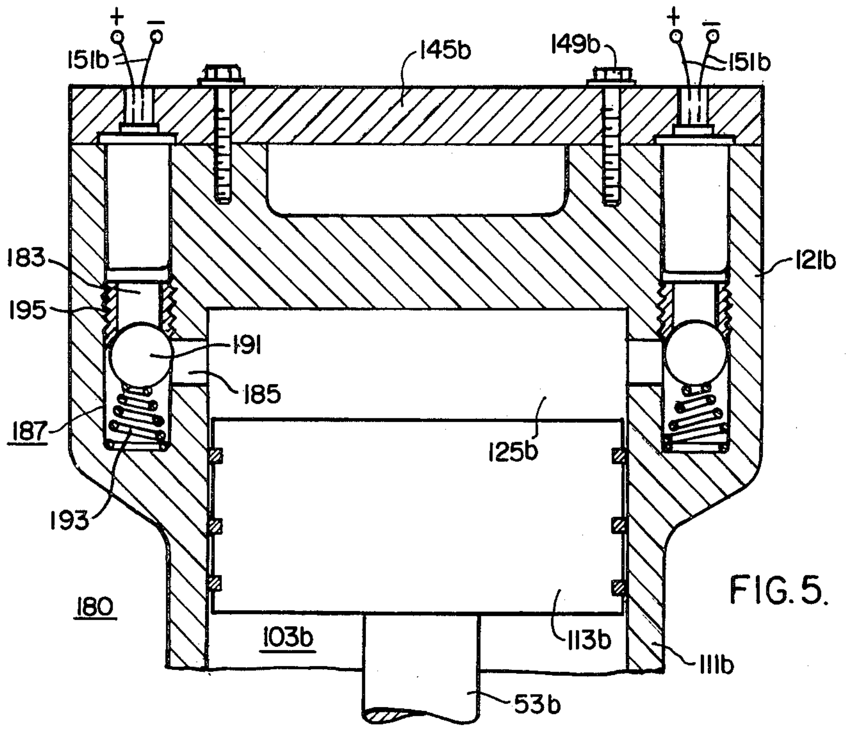
FIG. 5 is another embodiment of the drive means shown generally in FIG. 1.

Referring now to FIG. 5 there is shown another embodiment of drive means 1 constructed according to the teachings of the invention in which similar numbers combined with lower case letter b refer to similar parts with modifications to those shown in FIGS. 3 and 4. Drive means 180 is again similar in construction and operation to drive means 100 and drive means 160 of FIGS. 3 and 4 with the important difference that the drive means 180 eliminates the need for an indexing or revolving seal plate, while sealing off the products of combustion from a predetermined combustion chamber from the remaining combustion chambers to prevent hot gases from the ignited chamber from causing pressure generated or heat generated combustion in any one of the others of the chambers. Drive means 180 accomplishes this principally by a variation in the combustion chambers and the addition of check valve in each of the combustion chambers. Combustion chambers 183 of drive means 180 now include a radial portion 185 and an axial portion 187 disposed to a predetermined depth within housing 121*b* past radial portion 185. A check valve means 189 is now disposed within combustion chamber 183 and includes check valve ball 191, conical ball spring 193, and valve seat insert 195. Check valve means 187 serves the same function as a rotating seal plate. Check valve balls 191 are biased by conical ball spring 193 to seal off the unfired cartridges. Pressure within conduit 125' due to ignition of another charge would increase the sealing effort of check valve ball 191. In operation, of course, the fired charge or cartridge within a preselected combustion chamber 183 would unseat check valve ball 191 and move it aside until the pressure was vented into conduit means 125*b* and dropped sufficiently for conical ball spring 193 to again reseat check valve ball 191 against valve seat insert 195.

In conclusion, what has been disclosed is a chemical operator reloader drive means with multiple combustion chambers disposed within a fixed non-rotatable housing and a directing means for selectively directing the expulsion of gaseous medium from any one of the multiple combustion chambers away from the remainder of the multiple combustion chambers and into the drive cylinder. Three alternate embodiments, a check valve directing means and two seal plate arrangement directing means have also been disclosed. The drive means according to the teachings of the invention are fully operable with a minimum of operation forces or energy and the possibility of using low energy auxiliary devices such as solenoid operated or breaker linkage operated arrangements becomes apparent. Although the preferred embodiments of the invention described herein were developed in order to solve certain problems within circuit interrupter apparatus, the invention is not limited to such circuit interrupter application but rather is broadly applicable to any chemical operator single or double acting gas pressure drive cylinder apparatus.

We claim:

1. An electric circuit interrupter, comprising:
(a) a pair of separable contacts;
(b) operating means operatively connected to the contacts for opening and closing the contacts;
(c) drive means for driving the operating means including a drive cylinder and a drive piston, said drive piston having a drive rod operatively connected to said operating means; and
(d) pressure generating means for generating an expulsion of gaseous medium into said drive cylinder, said pressure generating means including a housing having multiple stationary combustion chambers and directing means for selectively directing the expulsion of gaseous medium from any one of said multiple combustion chambers away from the remainder of said multiple combustion chambers and into said drive cylinder.

2. The electric circuit interrupter of claim 1 wherein the housing of the pressure generating means has a plurality of combustion chambers disposed along the circumference described by a predetermined radius, and wherein the directing means includes a seal plate having an aperture disposed therein at said predetermined radius, sealing means for sealing said aperture with said combustion chambers in said housing, indexing means for indexing said seal plate such that said aperture selectively aligns with one of said combustion chambers at a time, and conduit means for channeling said expulsion of gaseous medium from said aperture to the drive cylinder.

3. The electric circuit interrupter of claim 2 wherein the seal plate has a cylindrical wall portion disposed at a predetermined radius and the combustion chambers have at least a portion thereof extending radially outward from said predetermined radius in close sliding relationship with said cylindrical wall portion to provide a pressure generating means having a smaller diameter seal plate for a given number of combustion chamber capacity housing which provides for a reduced load on the indexing means.

4. The electric circuit interrupter of claim 1 wherein the directing means includes a plurality of check valves and a conduit means for conducting said expulsion of gases from said plurality of combustion chambers to said drive cylinder, said check valves arranged to permit the expulsion of gaseous medium out of each combustion chamber into said conduit means and prevent the movement of said expulsion of gases in the opposite direction.

5. An electric circuit interrupter, comprising:
(a) separable contacts;
(b) a plurality of stationary gas pressure generating chambers;
(c) operating means interconnected with said contacts for moving one of said contacts relative to the other in response to gas pressure; and
(d) selecting means interconnected with said chambers and said operating means for channeling pressurized gas from one of said chambers to said operating means at a time.

6. The combination as claimed in claim 1 wherein said gas pressure is generated in said chambers by combustion, wherein said selecting means cooperates with each of said chambers to prevent hot gas from one of said chambers from causing pressure generating combustion in another of said chambers.

7. Pressure generating apparatus for generating an expulsion of gaseous medium into a drive cylinder, comprising:
a housing having multiple stationary combustion chambers and directing means for selectively directing the expulsion of gaseous medium from any one of said multiple combustion chambers away from the remainder of said multiple combustion chambers and into said drive cylinder.

8. Pressure generating apparatus of claim 7 wherein the housing of the pressure generating means has a plurality of combustion chambers disposed along the circumference described by a predetermined radius, and wherein the directing means includes a seal plate having an aperture disposed therein at said predetermined radius, sealing means for sealing said aperture with said combustion chambers in said housing, indexing means for indexing said seal plate such that said aperture selectively aligns with one of said combustion chambers at a time, and conduit means for channeling said expulsion of the movement of said expulsion of gases in the opposite direction.

9. Pressure generating apparatus of claim 8 wherein the seal plate has a cylindrical wall portion disposed at a predetermined radius and the combustion chambers have at least a portion thereof extending radially outward from said predetermined radius in close sliding relationship with said cylindrical wall portion to provide a pressure generating means having a smaller diameter seal plate for a given number of combustion chamber capacity housing which provides for a reduced load on the indexing means.

10. Pressure generating apparatus according to claim 7 wherein the directing means includes a plurality of check valves and a conduit means for conducting said expulsion of gases from said plurality of combustion chambers to said drive cylinder, said check valves arranged to permit the expulsion of gaseous medium out of each combustion chamber into said conduit means and prevent the movement of said expulsion of gases in the opposite direction.

* * * * *